July 18, 1933.   R. H. DART   1,918,591
AUTOMOBILE JACK
Filed Feb. 1, 1928   2 Sheets-Sheet 1
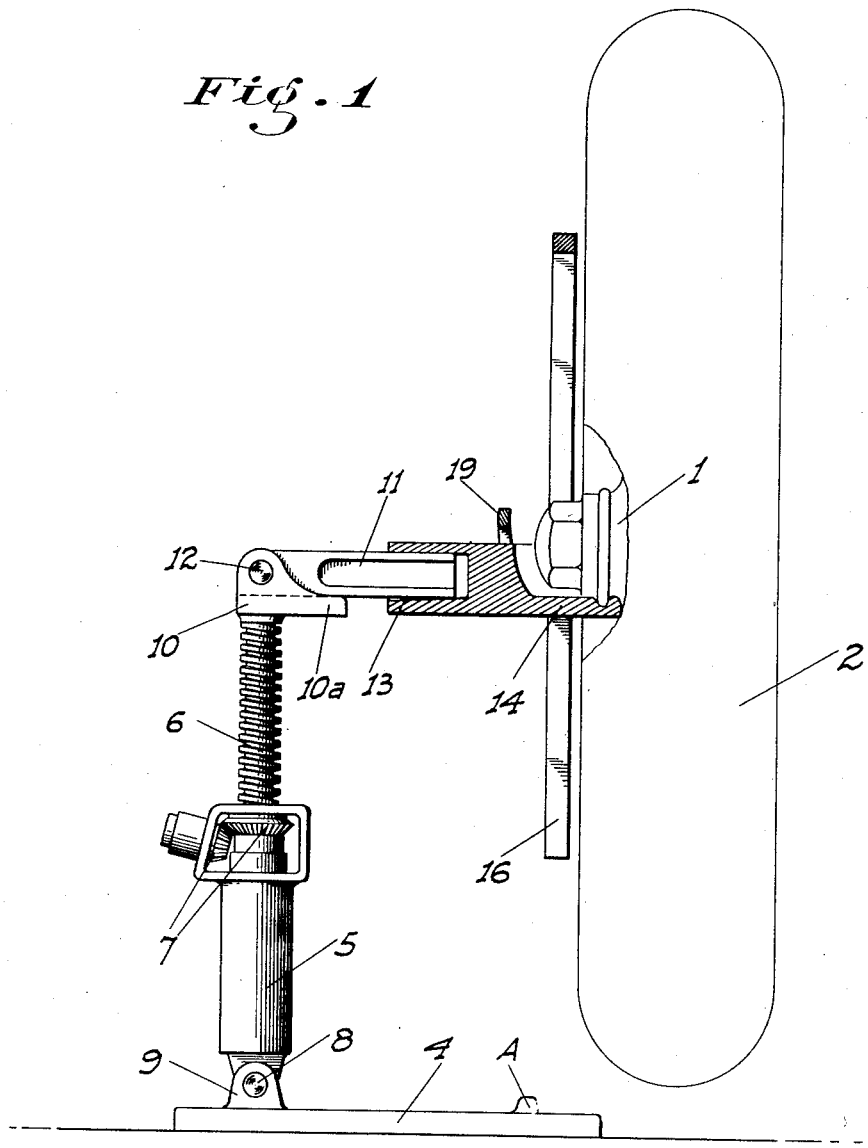
INVENTOR
R. H. Dart
BY
ATTORNEY

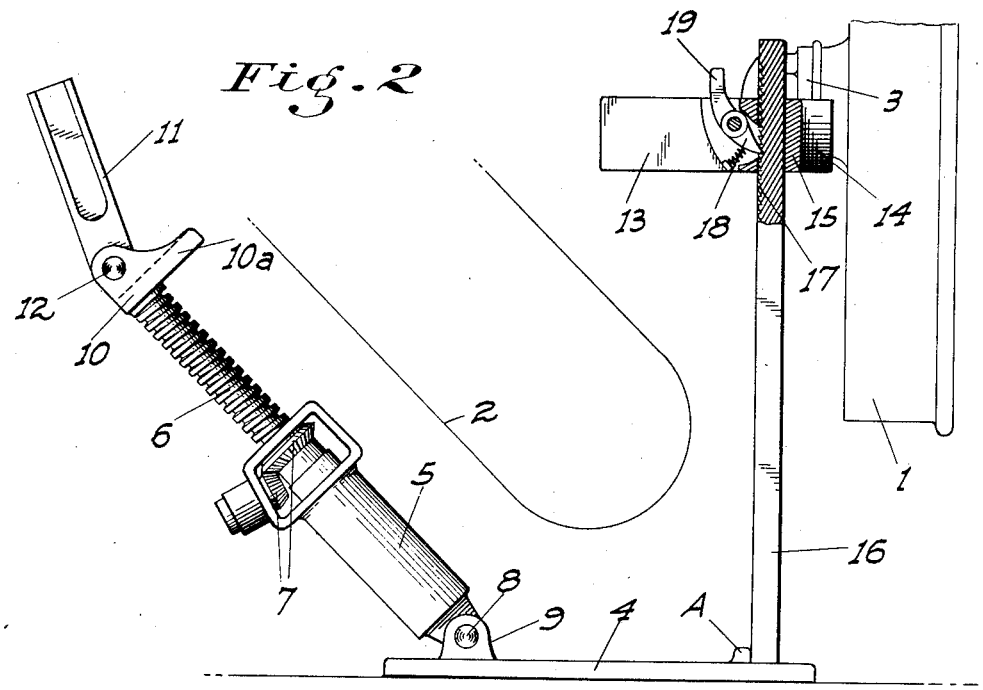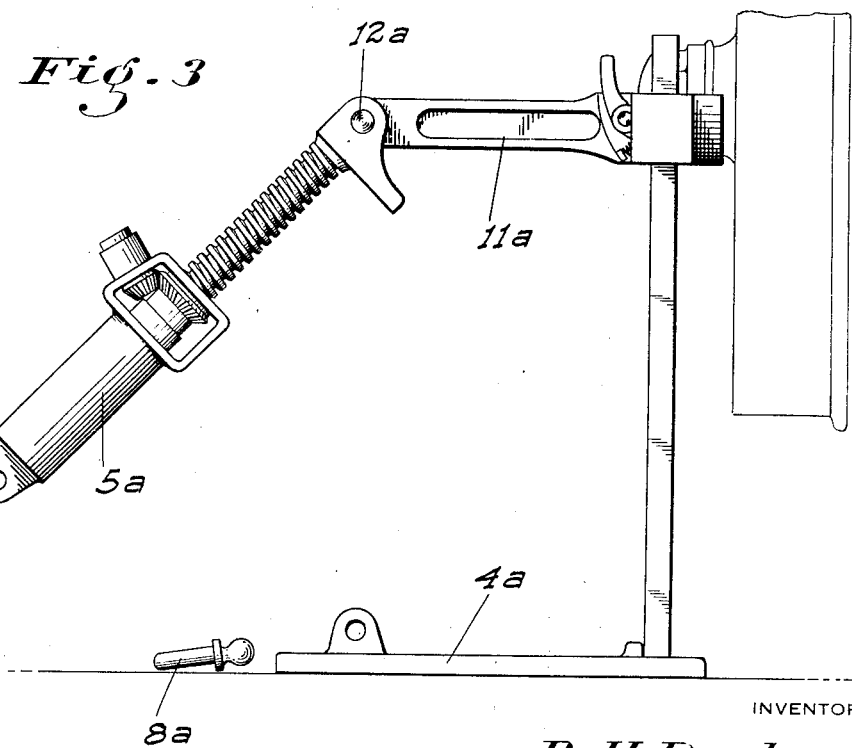

Patented July 18, 1933

1,918,591

UNITED STATES PATENT OFFICE

ROBERT H. DART, OF SACRAMENTO, CALIFORNIA

AUTOMOBILE JACK

Application filed February 1, 1928. Serial No. 251,116.

This invention relates to jacks for motor vehicles, particularly of the type which is adapted to be used by the individual owner and which is carried in the car and used to raise the individual wheels and remove and replace tires when necessary.

The principal object of my invention is to provide a jack of this general character adapted to be engaged with the hub of the wheel from the outside of the latter, and which when so engaged will permit of the desired removal and replacement of a tire and rim relative to the wheel.

The advantages had in convenience of operation with a jack thus placeable will be readily appreciated by those who have had occasion to use the ordinary type of jack, which must be shoved under the car between the wheels to engage the axles or springs. This is usually a very inconvenient operation to perform, especially at night, under muddy or soft road conditions, when the car is equipped with a rear trunk and other overhanging members which extend rearwardly a considerable distance beyond the rear axle (the tires of which are the ones most liable to require attention), and with cars equipped with the modern large balloon tires which when deflated lower the axle to a considerable extent.

Even under the most favorable conditions the placing and manipulating of the ordinary jack is an awkward operation to perform and it is almost impossible to prevent the clothing from becoming spotted with grease or mud.

With my improved jack, on the other hand, all operations are carried out from the side of the car, where there is plenty of room to operate, where everything may be readily seen even at night, and where no crouching in the dirt or reaching past greasy shackles, etc., is necessary in placing or manipulating the jack.

A further advantage of my improved jack structure lies in the fact that a longer jack barrel may be used, with a correspondingly longer screw stem—a feature which avoids the use of the telescopic or multiple screw stems now necessary, especially in connection with balloon tire equipped cars.

A further object of the invention is to produce a simple and inexpensive device and yet one which will be exceedingly effective for the purpose for which it is designed.

These objects I accomplish by means of such structure and relative arrangement of parts, as will fully appear by a perusal of the following specification and claims.

In the drawings similar characters of reference indicate corresponding parts in the several views:

Fig. 1 is a side elevation of my improved jack structure as applied to a wheel, showing the wheel raised but the tire still in place thereon.

Fig. 2 is a similar view showing the tire removed and the jack in position to enable the tire to be drawn entirely clear of the jack and wheel.

Fig. 3 is a side elevation of a modified form of jack.

Referring now more particularly to the characters of reference on the drawings, and particularly at present to Figs. 1 and 2, 1 denotes any standard automobile wheel on which the tire 2 is mounted in the customary demountable manner, and 3 denotes the outwardly projecting hub structure of the wheel.

My improved jack, which is used to raise the wheel by engaging the hub, comprises a base plate 4 of suitable area, providing a firm support for the jack which is mounted thereon. The jack itself is of ordinary construction, consisting essentially of a vertical barrel 5 from which a screw stem 6 projects upwardly; the movement of the stem being controlled by any suitable mechanism such as indicated at 7. The barrel is pivoted onto the plate 4 by means of a pin 8 mounted in ears 9 on said plate and barrel, the axis of the pin extending longitudinally of the wheel. The barrel is mounted on the plate at such a point that when the plate is placed closely against the wheel, the barrel will then be a sufficient distance outwardly of the wheel to permit the reception of the tire when removed in the space between the wheel and barrel, with a certain amount of clearance. Turnably mounted on top of the stem 6 is a head 10 from which a horizontal arm 11 projects toward the wheel, the arm being pivoted on the head by a pin 12 and being prevented from movement below a horizontal plane by a stop 10a formed with the head. The outer end of the arm detachably fits into a socket member 13 which projects outwardly relative to the wheel from a cradle 14 which is adapted to removably engage a hub 3 from below the same.

The sides of the cradle are formed with vertically bored bosses 15 through which rigid bars 16 are slidable, said bars preferably being connected at the upper end so as to form a single rigid unit. The length of the bars is such that their lower ends may rest on the plate 4 while still being engaged with the bosses, but short enough to be of lesser length over all than the interior diameter of the rim of the tire. On one side the bars for a certain portion of their length are provided with ratchet teeth 17 which are preferably shrouded, which teeth are normally engaged by spring pressed pawls 18 mounted in connection with the cradle. These pawls are manipulated and simultaneously released from the bar teeth when desired by means of a finger bar 19 extending across the cradle and connected to the pawls.

In operation the plate 4 is positioned relative to the wheel to be raised so that the cradle is longitudinally alined with the axis of the hub, and the screw-stem is manipulated so that the cradle will pass under and engage said hub. The operating mechanism 7 of the jack is then actuated to raise the wheel to the necessary height, when the bars 16 are positioned so that both ends clear the horizontal plane of the opposite sides of the rim, as shown in Fig. 1 or said bars may be removed temporarily. The tire and rim are then removed as a unit as usual and are allowed to rest on the ground in surrounding relation to the jack. The bars 16, which form an auxiliary jack are then depressed until they rest on the plate 4, the latter being provided if necessary with an upstanding abutment A to prevent possible outward slipping movement of the bars. The jack stem is then lowered sufficiently to cause the weight to be taken by the bars and released from the stem and arm 11. The jack is then turned outwardly about the pin 8 as an axis, which causes the arm 11 to be drawn clear of the sockets 3 and enables the tire to be removed clear of the jack through the open space thus provided between the members 11 and 13 as indicated in Fig. 2.

The replacement tire is then similarly positioned relative to the jack, the arm 11 is again coupled to the socket, the stem is manipulated to take the weight and relieve the bars 16 of such weight and the latter are then withdrawn from the plate and replaced in the original position. The tire may then be secured onto the wheel and the jack subsequently removed. The hinging of the arm 11 onto the stem head enables the jack barrel and arm to assume a straight-line position when not in use so that the device may be readily stored under a car seat or other location in the car as usual.

The above operations are carried out in connection with a wheel in which the tire and rim only are removed. For use with a wheel which is removed as a unit with the tire, leaving only a relatively small opening at the hub, the bars 16 must be removed when the tire and wheel are being removed or replaced, and said wheel is then maintained in upright position clear of the hub while the bars are mounted in position to take the weight as previously stated. The disengaging of the arm from the socket 13 then permits the wheel to be drawn clear of the socket member as will be evident.

If desired the arm and socket may be made as a one-piece rigid unit as shown at 11a in Fig. 3, while the pin 8a between the barrel 5a and the plate 4a is removable. In this case to remove the tire from about the jack, the barrel is swung upwardly from its lower end about the pivot 12a of the arm 11a as an axis, until the lower end of the barrel is a sufficient distance from the ground to enable the tire to be drawn clear of the jack through the open space thus provided.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A wheel jack comprising a ground bearing plate to project outwardly of a wheel, a barrel projecting upwardly from the plate, a pivot connection between the barrel and plate disposed longitudinally of the plane of the wheel, a screw stem projecting from the upper end of the barrel, a lateral extension structure projecting toward the wheel from the upper end of the stem, a cradle formed at the outer end of the structure for engagement with the wheel-hub, and a vertical bar slidably mounted in connection with the cradle to one side of the same for detachable engagement with the plate.

2. A structure as in claim 1, with a pivot connection, parallel to the barrel-pivot, between the stem and said extension structure.

3. A wheel jack comprising a ground bearing plate to project outwardly of a wheel, a barrel projecting upwardly from the plate, a pivot connection between the barrel and plate disposed longitudinally of the plane of the wheel, a screw stem projecting from the upper end of the barrel, a lateral member projecting toward the wheel from the upper end of the stem, a socket member to removably but rigidly receive the outer end of the lateral member, a cradle on the outer end of the socket member for engagement with the hub of the wheel, and means for disengageably and directly supporting the cradle from the plate.

4. A wheel jack including a vertically movable stem, supporting means for the stem, a rigid structure supported by and projecting laterally from the upper end of the stem a distance not less than the diameter of the wheel-tire and adapted at its outer end to engage the hub of the wheel whereby to raise the wheel with the upward movement of the stem and enable the tire to be drawn off the wheel to occupy a position between the wheel and stem and in surrounding relation to the structure; the latter comprising alined members separably connected together, means connected to said structure for supporting the same from the ground independently of the stem and located between the wheel and the tire when the latter is removed, and a pivot connection between the stem and its supporting means arranged to enable the stem and the adjacent member of the lateral structure to be moved away from the wheel and the other member of the structure.

5. A wheel jack including a vertically movable stem, supporting means for the stem, a rigid structure supported by and projecting laterally from the upper end of the stem a distance not less than the diameter of the wheel-tire and adapted at its outer end to engage the hub of the wheel whereby to raise the wheel with the upward movement of the stem and enable the tire to be drawn off the wheel to occupy a position between the wheel and stem and in surrounding relation to the structure; said structure being pivoted at one end onto the stem, means preventing downward turning movement of said structure relative to the stem beyond a horizontal plane in one direction when the stem is vertically disposed, means connected to the structure adjacent the wheel for supporting the same independently of the stem, and detachable connecting means between the stem and its support.

ROBERT H. DART.